US012609398B2

(12) United States Patent
Seo et al.

(10) Patent No.: US 12,609,398 B2
(45) Date of Patent: Apr. 21, 2026

(54) BATTERY PACK AND VEHICLE INCLUDING THE SAME

(71) Applicant: LG ENERGY SOLUTION, LTD., Seoul (KR)

(72) Inventors: Sung-Won Seo, Daejeon (KR); Dal-Mo Kang, Daejeon (KR); Jeong-O Mun, Daejeon (KR); Hyeon-Ki Yun, Daejeon (KR); Eun-Ah Ju, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 240 days.

(21) Appl. No.: 18/271,586

(22) PCT Filed: Aug. 10, 2022

(86) PCT No.: PCT/KR2022/011957
§ 371 (c)(1),
(2) Date: Jul. 10, 2023

(87) PCT Pub. No.: WO2023/027391
PCT Pub. Date: Mar. 2, 2023

(65) Prior Publication Data
US 2024/0063494 A1 Feb. 22, 2024

(30) Foreign Application Priority Data
Aug. 25, 2021 (KR) ........................ 10-2021-0112494

(51) Int. Cl.
*H01M 50/264* (2021.01)
*H01M 50/211* (2021.01)
(Continued)

(52) U.S. Cl.
CPC ....... *H01M 50/264* (2021.01); *H01M 50/211* (2021.01); *H01M 50/258* (2021.01); *F16B 2/243* (2013.01); *H01M 2220/20* (2013.01)

(58) Field of Classification Search
CPC ............. H01M 50/264; H01M 50/211; H01M 50/258; H01M 2220/20; H01M 50/204;
(Continued)

(56) References Cited

U.S. PATENT DOCUMENTS

| 2008/0164081 A1 | 7/2008 | Watanabe et al. | |
| 2010/0112424 A1* | 5/2010 | Hayashi .............. | H01M 16/006 |
| | | | 429/99 |

(Continued)

FOREIGN PATENT DOCUMENTS

| CN | 206322750 | * | 7/2017 |
| CN | 208078047 | * | 11/2018 |

(Continued)

OTHER PUBLICATIONS

International Search Report for PCT/KR2022/011957 (PCT/ISA/210) mailed on Nov. 28, 2022.
(Continued)

*Primary Examiner* — Lisa S Park
(74) *Attorney, Agent, or Firm* — Birch, Stewart, Kolasch & Birch, LLP

(57) ABSTRACT

A battery pack includes a pack tray; and at least one battery module provided on the pack tray. The at least one battery module includes a battery cell assembly mounted on the pack tray and including at least one battery cell; a pair of side plates provided on both side surfaces of the battery cell assembly to support the battery cell assembly and fixed to the pack tray; and a band unit connected to the pair of side plates and configured to at least partially cover an upper side and a lower side of the battery cell assembly.

15 Claims, 11 Drawing Sheets

(51) Int. Cl.
    *H01M 50/258*        (2021.01)
    *F16B 2/24*          (2006.01)

(58) Field of Classification Search
    CPC ... H01M 50/244; H01M 50/249; F16B 2/243;
                    Y02E 60/10; B60K 1/04
    See application file for complete search history.

(56)                    References Cited

U.S. PATENT DOCUMENTS

| | | | |
|---|---|---|---|
| 2014/0127552 A1 | 5/2014 | Lu et al. | |
| 2015/0104676 A1* | 4/2015 | Okada | H01M 50/296 |
| | | | 429/7 |
| 2019/0020055 A1* | 1/2019 | Chi | H01M 10/0481 |
| 2019/0189982 A1 | 6/2019 | Lee et al. | |
| 2020/0176745 A1* | 6/2020 | Lee | H01M 50/569 |
| 2022/0181733 A1 | 6/2022 | Choi et al. | |

FOREIGN PATENT DOCUMENTS

| | | | |
|---|---|---|---|
| CN | 209515879 U | 10/2019 | |
| CN | 209804785 U | 12/2019 | |
| CN | 211017198 U | 7/2020 | |
| CN | 214043892 U | 8/2021 | |
| EP | 3 340 340 A1 | 6/2018 | |
| EP | 3 879 621 A1 | 9/2021 | |
| JP | 2006-185815 A | 7/2006 | |
| JP | 2008-53019 A | 3/2008 | |
| JP | 2008-192551 A | 8/2008 | |
| JP | 2008-282625 A | 11/2008 | |
| JP | 2008282625 | * | 11/2008 |
| JP | 2009-301969 A | 12/2009 | |
| JP | 4415910 B2 | 2/2010 | |
| JP | 2015-106531 A | 6/2015 | |
| JP | 2018-41653 A | 3/2018 | |
| JP | 2018-77936 A | 5/2018 | |
| JP | 2018-83524 A | 5/2018 | |
| JP | WO2020/026966 A1 | 2/2020 | |
| KR | 10-1601568 B1 | 3/2016 | |
| WO | WO 2021/071052 A1 | 4/2021 | |

OTHER PUBLICATIONS

Extended European Search Report for European Application No.
22861601.7, dated Nov. 25, 2024.

* cited by examiner

FIG. 9

BATTERY PACK AND VEHICLE INCLUDING THE SAME

TECHNICAL FIELD

The present disclosure relates to a battery pack and a vehicle including the same, and more particularly, to a battery pack prepared to further increase an energy density and reduce overall weight, and to a vehicle including the same.

The present application claims priority to Korean Patent Application No. 10-2021-0112494 filed on Aug. 25, 2021 in the Republic of Korea, the disclosures of which are incorporated herein by reference.

BACKGROUND ART

Secondary batteries have high applicability according to product groups and electrical characteristics such as high energy density, and thus, are commonly applied not only to mobile devices but also to electric vehicles (EVs) or hybrid vehicles (HEVs) driven by electric power sources. Because secondary batteries may radically reduce the use of fossil fuel and do not generate any by-products that come with energy consumption, the secondary batteries are gaining attention as a new alternative energy source for improving eco-friendliness and energy efficiency.

Types of secondary batteries that are currently widely used include lithium-ion batteries, lithium polymer batteries, nickel cadmium batteries, nickel hydride batteries, and nickel zinc batteries. An operating voltage of a unit secondary battery cell, that is, a unit battery cell, ranges from about 2.5 V to about 4.5 V. Accordingly, when a higher output voltage is required, a battery pack may be configured by connecting a plurality of battery cells in series. Also, a battery pack may be configured by connecting a plurality of battery cells in parallel according to charge/discharge capacity required for the battery pack. Accordingly, the number of battery cells included in a battery pack may be set in various ways according to a required output voltage or charge/discharge capacity.

When a battery pack is configured by connecting a plurality of battery cells in series/parallel, a method of first configuring a battery module including at least one battery cell and adding other elements by using the at least one battery module to configure a battery pack is general.

In the case of a conventional battery pack, generally, at least one battery cell assembly including battery cells and a box-shaped metallic housing structure accommodating the at least one battery cell assembly are included. In the case of a conventional battery pack, the housing structure accommodating the battery cell assembly is mounted on a pack tray of a vehicle.

However, in the structure of such a conventional battery pack, the energy density of the entire battery pack is lowered due to the weight or volume of the separate housing structure itself, and there is a problem that the weight of the entire battery pack is increased.

Therefore, it is required to find a way to provide a battery pack that can further increase the energy density and reduce the overall weight through weight reduction and a vehicle including the battery pack.

DISCLOSURE

Technical Problem

The present disclosure is designed to solve the problems of the related art, and therefore the present disclosure is directed to providing a battery pack capable of increasing energy density and a vehicle including the battery pack.

In addition, another object of the present disclosure is to provide a battery pack capable of reducing the overall weight through weight reduction and a vehicle including the battery pack.

In addition, another object of the present disclosure is to provide a battery pack capable of more efficiently controlling cell swelling and a vehicle including the battery pack.

Technical Solution

In one aspect of the present disclosure, there is provided a battery pack including: a pack tray; and at least one battery module provided on the pack tray, wherein the at least one battery module includes: a battery cell assembly mounted on the pack tray and including at least one battery cell; a pair of side plates provided on opposite side surfaces of the battery cell assembly to support the battery cell assembly and fixed to the pack tray; and a band assembly connected to the pair of side plates and configured to at least partially cover an upper side and a lower side of the battery cell assembly.

Preferably, the band assembly may include: at least one upper band member configured to at least partially cover the upper side of the battery cell assembly; and at least one lower band member disposed opposite to the at least one upper band member and configured to at least partially cover the lower side of the battery cell assembly.

Preferably, the at least one upper band member may include: an upper band body disposed on the upper side of the battery cell assembly; and an upper band fixing portion bent from the upper band body and fixed to the side plates.

Preferably, the at least one lower band member may include: a lower band body disposed on the lower side of the battery cell assembly; and a lower band fixing portion bent from the lower band body and fixed to the side plates.

Preferably, the at least one upper band member may be a plurality of upper band members, and the plurality of upper band members may be spaced apart from each other by a predetermined distance along a longitudinal direction of the battery cell assembly.

Preferably, the at least one lower band member may be a plurality of lower band members, and the plurality of lower band members may be spaced apart from each other by a predetermined distance along a longitudinal direction of the battery cell assembly.

Preferably, the pair of side plates may include: a support portion configured to support the battery cell assembly; and a fixing portion extending from the support portion and fixed to the pack tray.

Preferably, the support portion may cover a side surface of the battery cell assembly and be disposed perpendicular to the pack tray, and the fixing portion may be formed to protrude perpendicular to the support portion by a predetermined length.

Preferably, a mounting beam of a predetermined length may be provided on an upper surface of the pack tray, and the fixing portion may be fixed to the mounting beam.

Preferably, the fixing portion may be above the mounting beam.

Preferably, the at least one battery module may further include at least one fastening member for fixing the fixing portion and the mounting beam.

Preferably, the at least one fastening member may be fastened to the mounting beam through the fixing portion.

In another aspect of the present disclosure, there is also provided a vehicle including at least one battery pack according to the above embodiments.

A heat sink may be under the at least one battery module, and fasteners may extend through the pair of side plates into the pair of side plates.

Each of the pair of side plates may have an outwardly extending fixing portion, and the fasteners may be under the fixing portion.

A beam may extend next to the at least one battery module, at least one of the pair of side plates may have an outwardly extending fixing portion, and fasteners may extend through a top surface of the outwardly extending fixing portion and into the beam.

The at least one upper band member may include a coupling protrusion extending from the upper band fixing portion, and the coupling protrusion may extend into an aperture in one of the pair of side plates.

Advantageous Effects

According to various embodiments as described above, it is possible to provide a battery pack capable of increasing energy density and a vehicle including the battery pack.

In addition, according to various embodiments as described above, it is possible to provide a battery pack capable of reducing the overall weight through weight reduction and a vehicle including the battery pack.

In addition, according to various embodiments as described above, it is possible to provide a battery pack capable of more efficiently controlling cell swelling and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 9 is a view for describing a battery module according to still another embodiment of the present disclosure.

BEST MODE

The present disclosure will now be described more fully with reference to the accompanying drawings, in which exemplary embodiments of the present disclosure are shown. These embodiments are provided so that the present disclosure will be thorough and complete, and will fully convey the concept of the present disclosure to one of ordinary skill in the art, and the present disclosure may be embodied in many different forms and should not be construed as being limited to the embodiments set forth herein. In addition, in order to help the understanding of the present disclosure, the accompanying drawings are not drawn to scale, but dimensions of some components may be exaggerated.

Figure 1:
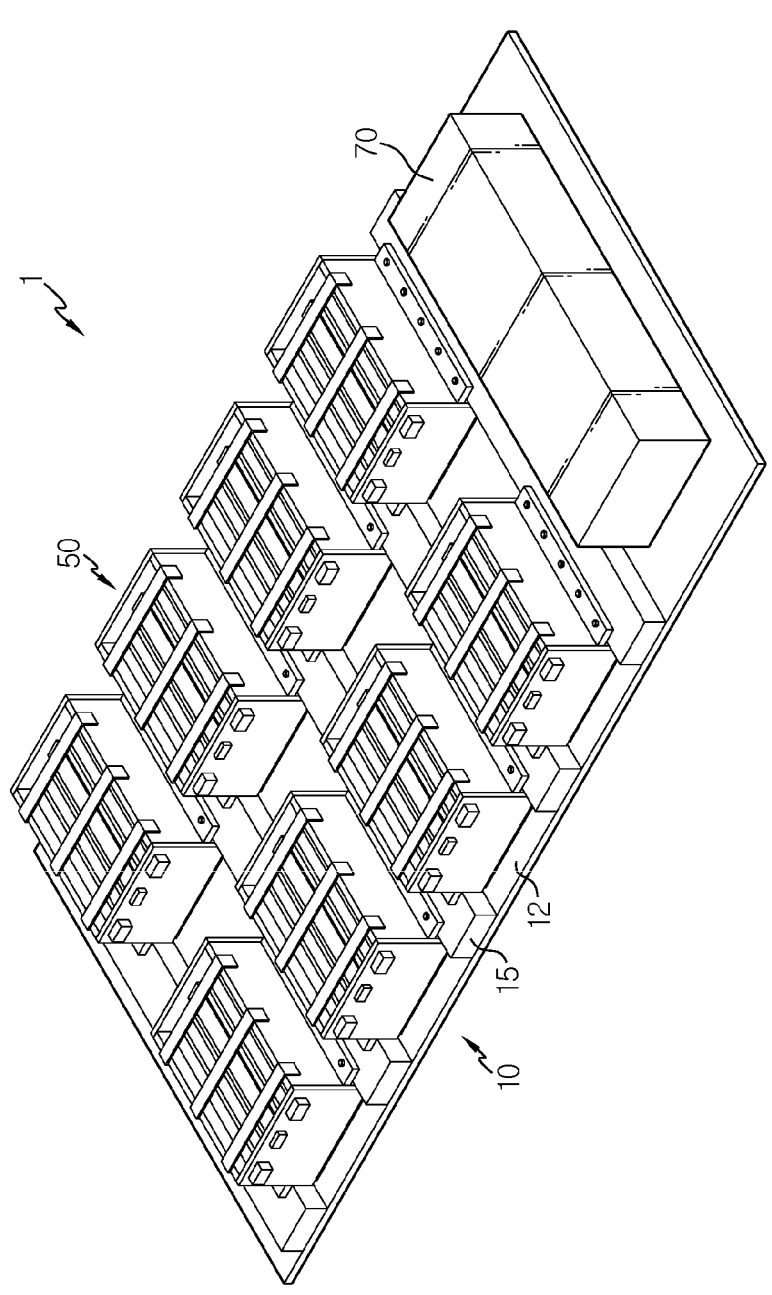
FIG. 1 is a view for describing a battery pack according to an embodiment of the present disclosure.
Figure 2:
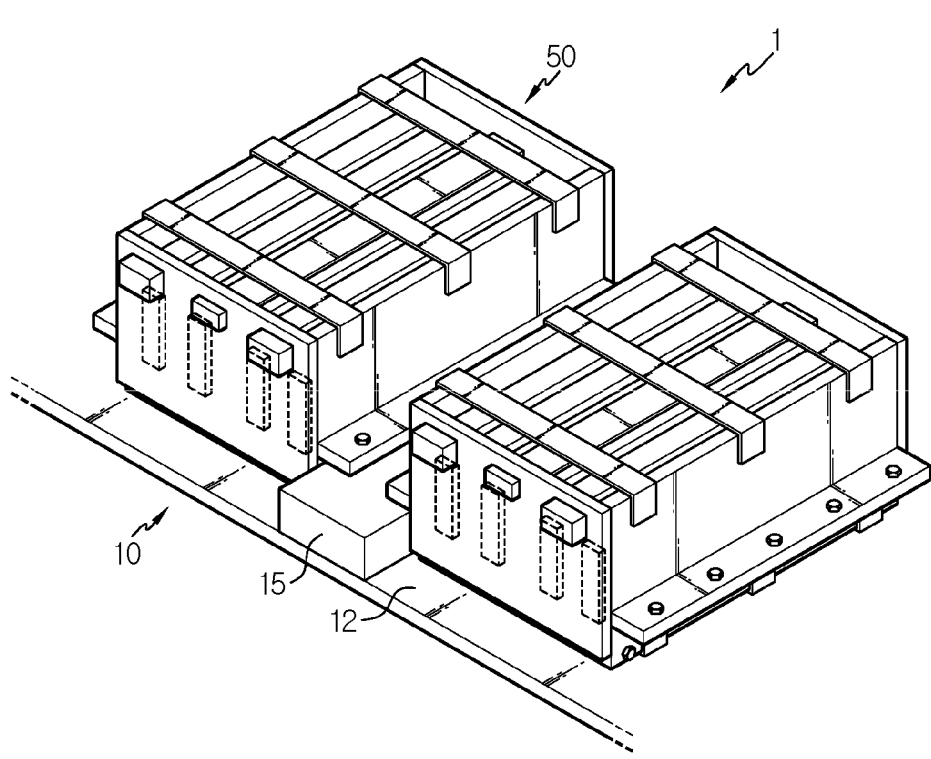
FIG. 2 is a view for describing the main part of the battery pack of FIG. 1.
Figure 3:
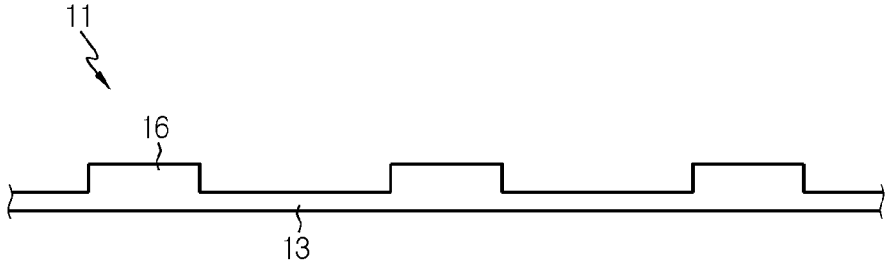
FIG. 3 is a view for describing a pack tray according to another embodiment of the battery pack of FIG. 2.

FIG. 1 is a view for describing a battery pack according to an embodiment of the present disclosure, FIG. 2 is a view for describing the main part of the battery pack of FIG. 1, and FIG. 3 is a view for describing a pack tray according to another embodiment of the battery pack of FIG. 2.

Referring to FIGS. 1 to 3, the battery pack 1 according to the present embodiment is provided in a vehicle (V, see FIG. 13) and may include a pack tray 10 and a battery module 50.

The pack tray 10 is mounted to the vehicle V and may support at least one battery module 50 and an electrical unit 70 to be described later.

The pack tray 10 may include a tray body 12 and a mounting beam 15.

Figure 13:
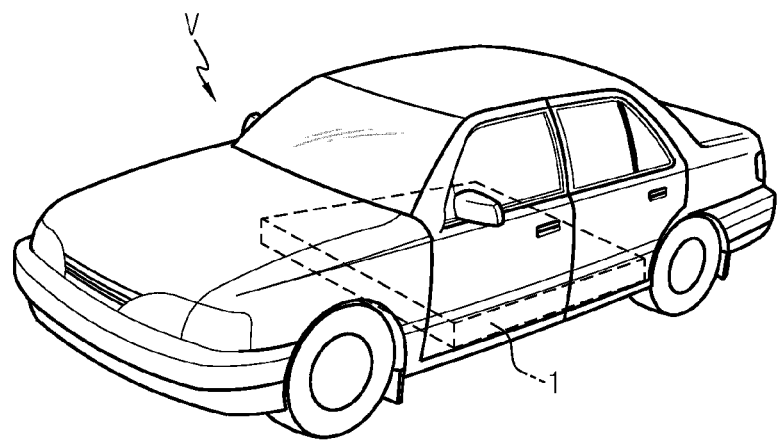
FIG. 13 is a view for describing a vehicle according to an embodiment of the present disclosure.

The tray body 12 may be mounted to the vehicle (V, see FIG. 13). The battery module 50 and the electrical unit 70 may be seated on the tray body 12.

The mounting beam 15 is provided in a predetermined length on the upper surface of the tray body 12, and may be provided between at least a pair of battery modules 50 described later. The mounting beam 15 may buffer shock transmitted from an external shock to the battery modules 50.

The mounting beam 15 may be provided in plurality. The plurality of mounting beams 15 may be provided between battery modules 50 described later. Of course, it is just an example, and the mounting beam 15 may be only provided between some of the battery modules 50.

Meanwhile, as shown in FIG. 3, the mounting beam 16 of the pack tray 11 may be integrally formed from the tray body 13. The mounting beams 16 may protrude from the tray body 13 in a concave-convex shape and be disposed to be spaced apart from each other by an interval capable of accommodating the bottom portion of the battery modules 50.

The battery module 50 is provided on the pack tray 10, and may be provided in at least one or in plurality. Hereinafter, in the present embodiment, the description is limited to that the battery module 50 is provided in plurality. The plurality of battery modules 50 will be looked at in more detail in the following related description.

In addition, the battery pack 1 may further include an electrical unit 70.

The electrical unit 70 may be mounted on the tray body 12 of the pack tray 10. The electrical unit 70 may include various electric components capable of managing or controlling the plurality of battery modules 50.

Hereinafter, the battery module 50 according to the present embodiment will be looked at in more detail.

Figure 4:
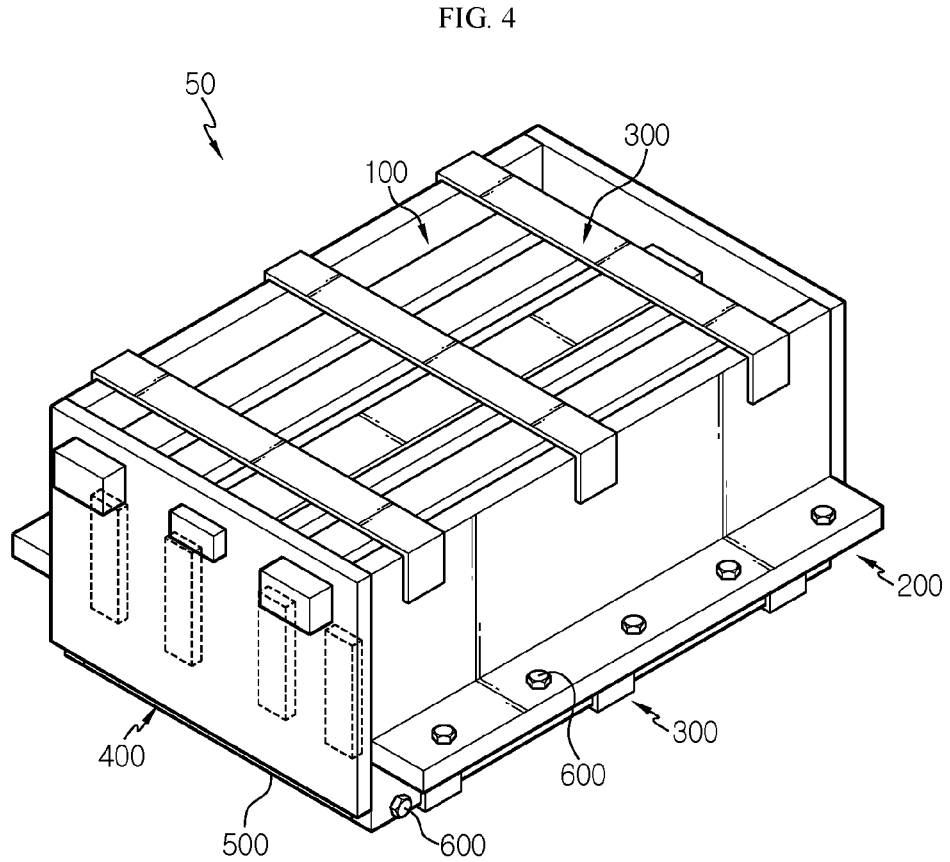
FIG. 4 is a view for describing the battery module of the battery pack of FIG. 1.
Figure 5:
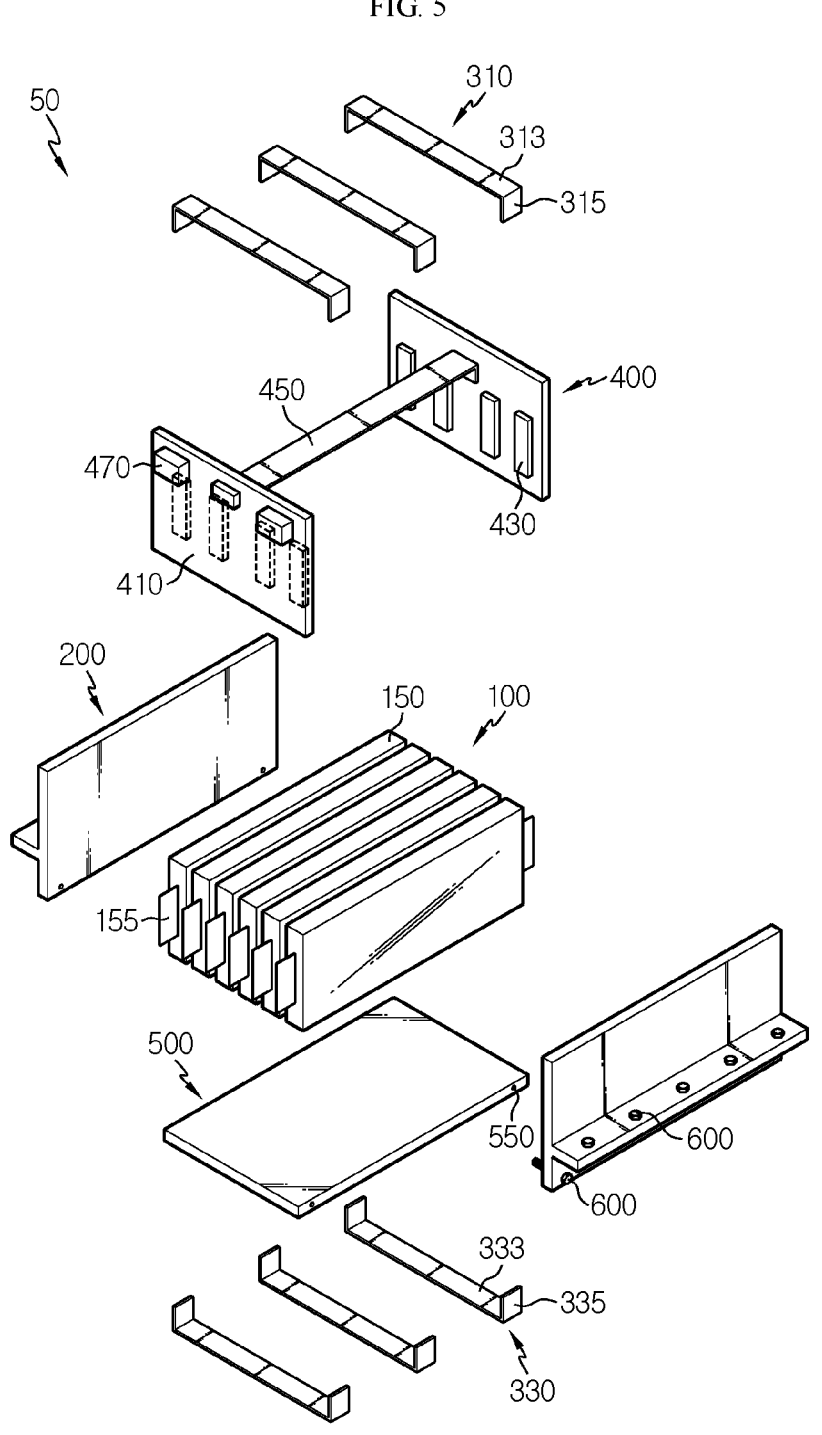
FIG. 5 is an exploded perspective view of the battery module of FIG. 4.
Figure 6:
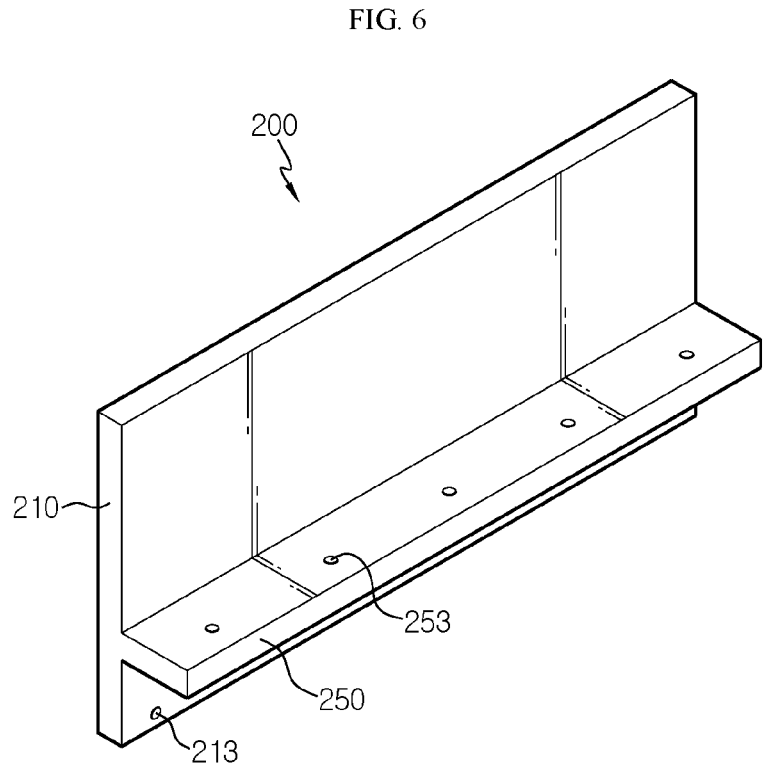
FIG. 6 is a view for describing a side plate of the battery module of FIG. 5.
Figure 7:
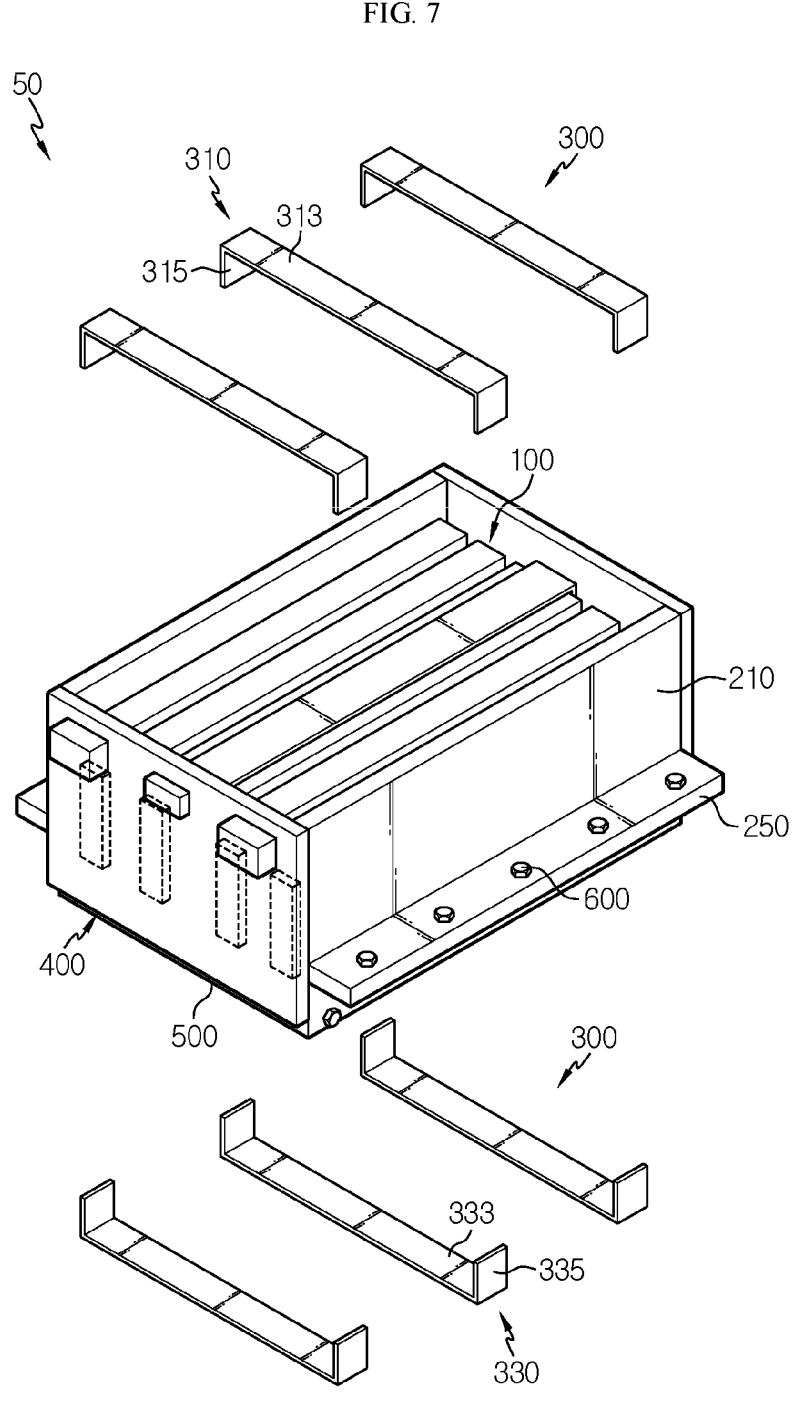
FIG. 7 is a view for describing the assembly of a band unit of the battery module of FIG. 5.

FIG. 4 is a view for describing the battery module of the battery pack of FIG. 1, FIG. 5 is an exploded perspective view of the battery module of FIG. 4, FIG. 6 is a view for describing a side plate of the battery module of FIG. 5, and FIG. 7 is a view for describing the assembly of a band unit of the battery module of FIG. 5.

Referring to FIGS. 4 to 7, the battery module 50 may include a battery cell assembly 100, a pair of side plates 200, and a band unit 300.

The battery cell assembly 100 may be mounted on the pack tray 10. The battery cell assembly 100 may include at least one or more battery cells 150. Hereinafter, in the present embodiment, the battery cell assembly 100 is limitedly described as including a plurality of battery cells 150.

The plurality of battery cells 150 are secondary batteries, and may include pouch-type secondary batteries, prismatic secondary batteries, or cylindrical secondary batteries. Hereinafter, in the present embodiment, the plurality of battery cells 150 will be described as being provided as pouch-type secondary batteries.

The plurality of battery cells 150 may each include an electrode assembly, a battery case accommodating the electrode assembly, and a pair of electrode leads 155 protruding out of the battery case and electrically connected to the electrode assembly.

The pair of side plates 200 are provided on both side surfaces of the at least one battery cell assembly 100 to support the at least one battery cell assembly 100, and may be fixed to the pack tray 10.

The pair of side plates 200 may include a support portion 210 and a fixing portion 250, respectively.

The support portion 210 may cover a side surface of the at least one battery cell assembly 100 and support the at least one battery cell assembly 100. The support portion 210 may be disposed perpendicular to the pack tray 10.

A heatsink fastening hole 213 may be provided in the support portion 210.

The heatsink fastening hole 213 is provided on the lower side of the support portion 210 and may be provided in plurality. In the plurality of heatsink fastening holes 213, fastening members 600 for fastening with the heatsink 500 may be penetrated or fastened.

The fixing portion 250 extends from the support portion 210 and may be fixed to the pack tray 10. The fixing portion 250 may be formed to protrude perpendicular to the support portion 210 from the support portion 210 by a predetermined length.

In the present embodiment, a rigid structure of the battery module 50 for controlling the cell swelling when an abnormal situation such as expansion due to cell swelling of the battery cell assembly 100 occurs may be secured through the protruding structure of the fixing portion 250, through the fixing portion 250.

The fixing portion 250 may be fixed to the mounting beam 15 of the pack tray 10. The fixing portion 250 may be formed higher than the height of the mounting beam 15 in the height direction of the pack tray 10.

A beam fastening hole 253 may be provided in the fixing portion 250.

The beam fastening hole 253 may be provided in plurality. Fastening members 600 for fastening with the mounting beam 15 of the pack tray 10 may be penetrated and fastened through the plurality of beam fastening holes 253.

In the case of the present embodiment, the battery module 50 may be directly coupled to the mounting beam 15 of the pack tray 10 through the pair of side plates 200 provided on each of the plurality of battery modules 50.

Accordingly, in the present embodiment, the battery modules 50 may be stably mounted on the pack tray 10 without an additional case structure for fixing to the pack tray 10, and the battery cell assembly 100 may be stably supported and fixed without a member such as a separate cover case of the battery module.

As a result, in the present embodiment, since a separate additional case and cover case structure similar to the prior art can be omitted, the overall energy density of the battery pack 1 may be remarkably increased, and a slimmer structure of the battery pack 1 may be realized.

The band unit 300 is connected to the pair of side plates 200 and may at least partially cover upper and lower sides of the battery cell assembly 100.

The band unit 300 may include an upper band member 310 and a lower band member 330.

The upper band member 310 at least partially covers the upper side of the battery cell assembly 100 and may be provided as a metal member made of an elastic material. For example, the upper band member 310 may be formed of a metal member made of aluminum or steel having a predetermined elasticity.

The upper band member 310 may be provided in at least one or in plurality. Hereinafter, in the present embodiment, the upper band member 310 will be described as being provided in plurality.

The plurality of upper band members 310 may be spaced apart from each other by a predetermined distance along the longitudinal direction of the battery cell assembly 100.

The plurality of upper band members 310 may include an upper band body 313 and an upper band fixing portion 315, respectively.

The upper band body 313 is made of a material having elasticity of a predetermined length, and may be disposed on the upper side of the at least one battery cell assembly 100 to at least partially cover the upper side of the battery cell assembly 100.

The upper band fixing portion 315 may be integrally formed with the upper band body 313, bent from the upper band body 313, and fixed to the side plates 200. Specifically, the upper band fixing portion 315 may be bent from both ends of the upper band body 313 to the lower side and fixed to the side plates 200.

The upper band fixing portion 315 may be in close contact with each side plate 200 while having elasticity. Meanwhile, the upper band fixing portion 315 may be additionally fixed to each side plate 200 by welding or the like. Accordingly, the upper band member 310 may be more stably fixed to the side plates 200.

The lower band member 330 is disposed opposite to the upper band member 310 and may at least partially cover the lower side of the battery cell assembly 100. The lower band member 330 may be provided with a metal member made of an elastic material. For example, the lower band member 330, like the upper band member 310, may be provided with a metal member made of aluminum or steel having a predetermined elasticity.

The lower band member 330 may be provided in at least one or in plurality. Hereinafter, in the present embodiment, the description is limited to that the lower band member 330 is provided in plurality.

The plurality of lower band members 330 may be spaced apart from each other by a predetermined distance along the longitudinal direction of the battery cell assembly 100.

The plurality of lower band members 330 may include a lower band body 333 and a lower band fixing portion 335, respectively.

The lower band body 333 is made of a material having elasticity of a predetermined length, and may be disposed on the lower side of the at least one battery cell assembly 100 to at least partially cover the lower side of the battery cell assembly 100.

The lower band fixing portion 335 may be integrally formed with the lower band body 333, bent from the lower band body 333, and fixed to the side plates 200.

Specifically, the lower band fixing portion 335 may be bent from both ends of the lower band body 333 to the lower side and fixed to the side plates 200.

The lower band fixing portion 335 may be in close contact with each side plate 200 while having elasticity. Meanwhile, the lower band fixing portion 335 may be additionally fixed to each side plate 200 by welding or the like. Accordingly, the lower band member 330 may be more stably fixed to the side plates 200.

Meanwhile, the battery module 50 may further include a bus bar assembly 400.

The bus bar assembly 400 is electrically connected to the battery cell assembly 100, and may cover the front and rear sides of the battery cell assembly 100.

The bus bar assembly 400 may include a bus bar cover 410, a bus bar member 430, a sensing PCB 450, and a connector 470.

The bus bar cover 410 may cover the front and rear sides of the battery cell assembly 100. To this end, the bus bar cover 410 may be provided as a pair to cover the front and rear sides of the battery cell assembly 100, respectively.

The bus bar member 430 is provided on the bus bar cover 410 and may be electrically connected to electrode leads 155 of the plurality of battery cells 150 of the battery cell assembly 100. The bus bar member 430 may be provided in plurality.

The sensing PCB 450 may connect the pair of bus bar covers 410 and may be provided as a flexible printed circuit board. The sensing PCB 450 is provided in a predetermined length and may be disposed on the upper side of the battery cell assembly 100.

The connector 470 is provided to at least one bus bar cover 410 and may be electrically connected to external devices. The connector 470 may be provided in plurality. For example, the plurality of connectors 470 may be provided as high voltage connectors, low voltage connectors, and the like.

Meanwhile, the battery module 50 may further include a heatsink 500.

The heatsink 500 is for cooling the battery cell assembly 100, and may be provided on the lower side of the battery cell assembly 100. The heatsink 500 may be provided on the tray body 12 of the pack tray 10.

A plurality of fastening holes 550 may be provided in the heatsink 500. A fastening member 600 for coupling with the side plate 200 may be fastened to the plurality of fastening holes 550.

Meanwhile, the heatsink 500 may be fixed with the side plate 200 by a coupling method, such as welding, in addition to fastening through the fastening member 600.

In the present embodiment, since the heatsink 500 is individually provided for each battery module 50, the cooling path of the battery module 50 may be shortened and the weight of the entire battery pack 1 may be reduced.

In addition, the battery module 50 may further include a fastening member 600.

The fastening member 600 is for fixing the fixing portions 250 of the pair of side plates 200 and the mounting beam 15 of the pack tray 10, and may be provided in plurality.

The plurality of fastening members 600 may be provided as bolting members. In addition, the plurality of fastening members 600 may fasten the pair of side plates 200 and the heatsink 500 to each other.

Specifically, the plurality of fastening members 600 may pass through the support portions 210 of the pair of side plates 200 and be fastened to the fastening hole 550 of the heatsink 500.

As such, the battery pack 1 according to the present embodiment may reduce the overall weight through weight reduction as well as increase energy density through the above-described structure.

In addition, the battery pack 1 according to the present embodiment may more efficiently control cell swelling through the band unit 300 fixed to the side plate 200 while having elasticity.

Figure 8:
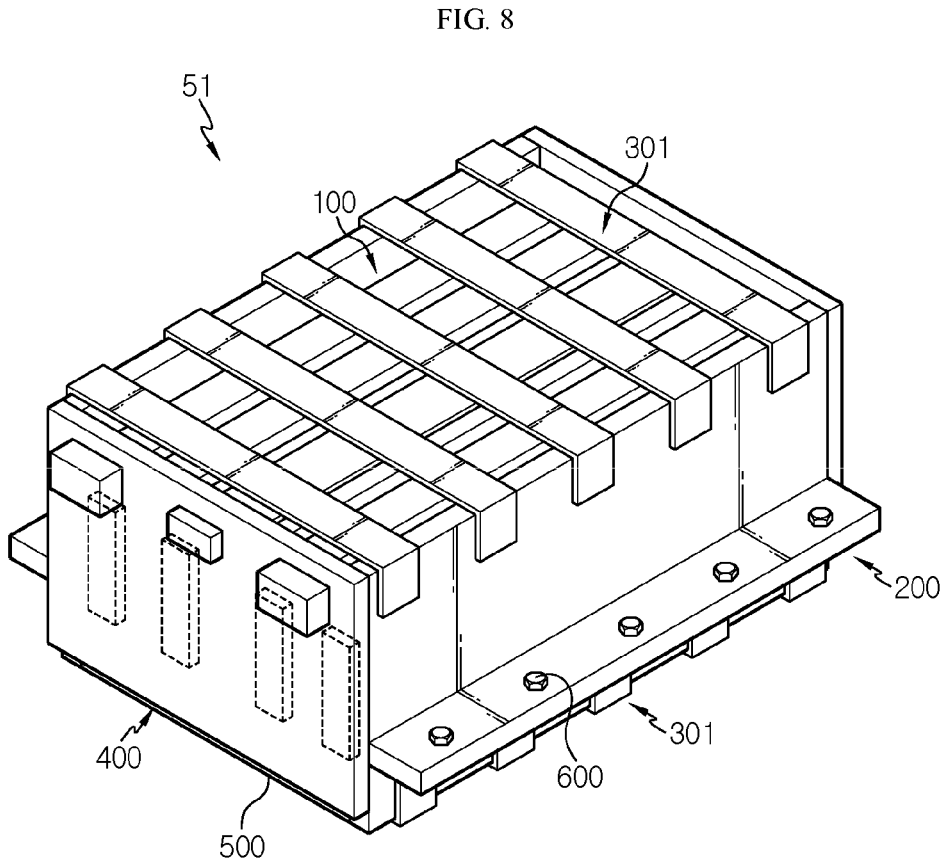
FIG. 8 is a view for describing a battery module according to another embodiment of the present disclosure.

FIG. 8 is a view for describing a battery module according to another embodiment of the present disclosure.

A battery module 51 according to the present embodiment is similar to the battery module 50 of the above embodiment, and thus a repeated description of elements that are substantially the same as or similar to those in the above embodiment will be omitted and the following will focus on a difference from the above embodiment.

Referring to FIG. 8, the battery module 51 may include a battery cell assembly 100, a pair of side plates 200, a band unit 301, a bus bar assembly 400, a heatsink 500, and a fastening member 600.

The battery cell assembly 100, the pair of side plates 200, the bus bar assembly 400, the heatsink 500 and the fastening member 600 are substantially the same as or similar to those in the above embodiment, and hereinafter, the overlapping description will be omitted.

The band unit 301 is provided in plurality and provided as a band member 301 to be disposed on the upper side and the lower side of the battery cell assembly 100, respectively, and the plurality of band units 301 are disposed to be spaced apart from each other by a predetermined distance and may be fixed to the side plates 200 to at least partially cover the battery cell assembly 100.

Among the plurality of band members 301, the band members 301 disposed at the outermost side may be provided near the bus bar assembly 400. As described above, in the bus bar assembly 400, electrode leads 155 of the battery cells (150, see FIG. 5) of the battery cell assembly 100 may be disposed for electrical connection.

Among the plurality of band members 301 provided near the bus bar assembly 400, the band members 301 disposed at the outermost side may cover the upper side and the lower side of the battery cell assembly 100 near the electrode leads 155 in the vicinity of the bus bar assembly 400, and secure the support strength of the battery cell assembly 100 in the vicinity of the bus bar assembly 400.

Therefore, among the plurality of band members 301 provided near the bus bar assembly 400, the band members 301 disposed at the outermost side may further increase the connection safety between the electrode leads 155 and the bus bar assembly 400, and even after the connection, separation or displacement of the electrode leads 155 from the bus bar assembly 400 may be effectively prevented.

Figure 9:
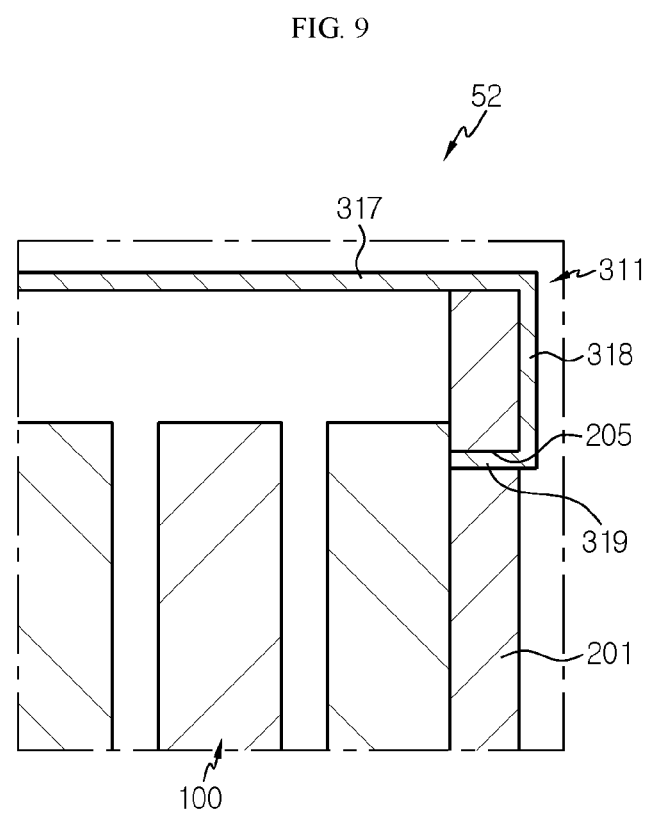

FIG. 9 is a view for describing a battery module according to still another embodiment of the present disclosure.

A battery module 52 according to the present embodiment is similar to the battery module 50 of the above embodiment, and thus a repeated description of elements that are substantially the same as or similar to those in the above embodiment will be omitted and the following will focus on a difference from the above embodiment.

Referring to FIG. 9, a hook coupling portion 205 having a predetermined groove or hole shape may be formed in the pair of side plates 201 of the battery module 51. The hook coupling portion 205 may be hook-coupled with band members 311 to be described later, and this will be described in more detail in the related description below.

The band members 311 of the band unit of the battery module 52 may include both the upper band members and the lower band members of the above embodiments. The band members 311 may include a band body 317 and a band fixing portion 318.

The band body 317 is made of a material having elasticity of a predetermined length, and may be made of a metal member of aluminum or steel having a predetermined elasticity, as in the above embodiment.

The band fixing portion 318 is formed integrally with the band body 317, is bent from the band body 317, and may be inserted into the side plates 200. To this end, a coupling protrusion 319 may be formed at an end of the band fixing portion 318. The coupling protrusion 319 may be hook-coupled to the hook coupling portion 205 of the side plate 201.

In the present embodiment, since the band members 311 are fixed to the side plate 200 through hook coupling, the band members 311 may be more stably and firmly fixed to the side plate 200.

Figure 10:
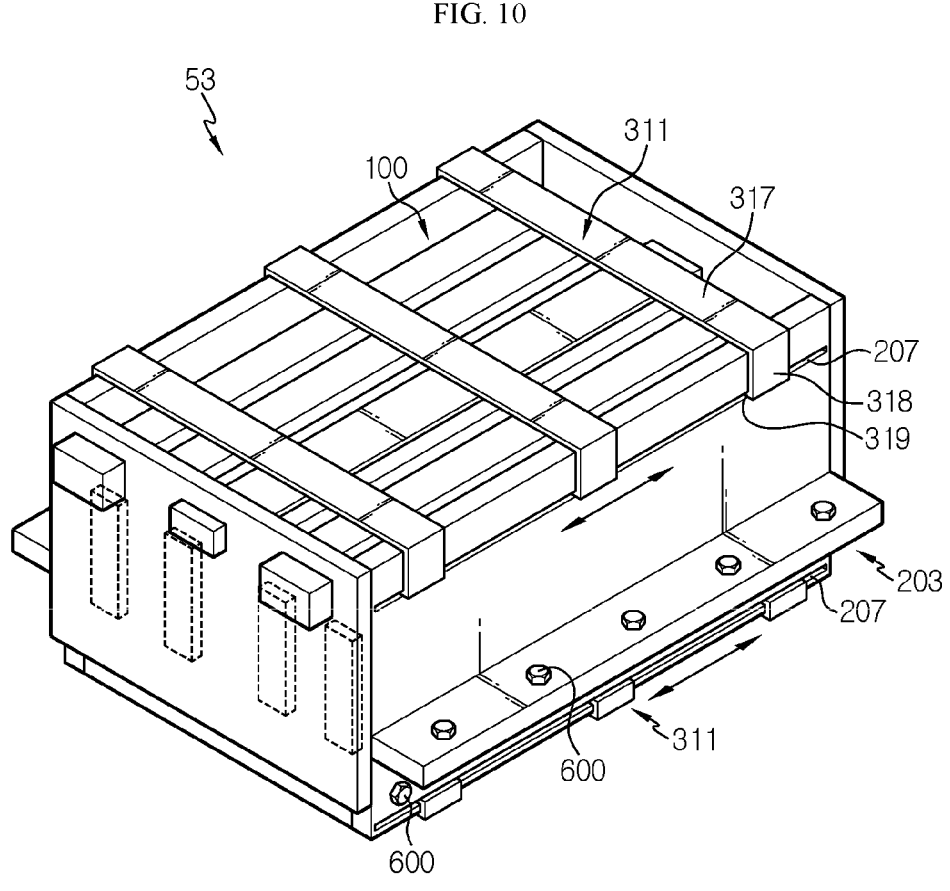
FIG. 10 is a view for describing a battery module according to still another embodiment of the present disclosure.

FIG. 10 is a view for describing a battery module according to still another embodiment of the present disclosure.

A battery pack 53 according to the present embodiment is similar to the battery pack 52 of the above embodiment, and thus a repeated description of elements that are substantially the same as or similar to those in the above embodiment will be omitted and the following will focus on a difference from the above embodiment.

Referring to FIG. 10, a sliding rail 207 having a predetermined length along the longitudinal direction of the side plates 203 may be formed on the pair of side plates 203 of the battery pack 53. The sliding rail 207 has a hole or groove shape of a predetermined depth, and may be provided on the upper side and the lower side of the pair of side plates 203, respectively.

The plurality of band members 311 may include the band body 317 and a band fixing portion 318 including the coupling protrusion 319, as in the above embodiment.

The plurality of band members 311 may be inserted into the sliding rail 207 in the longitudinal direction of the battery module 53 and coupled to the side plates 203 in a sliding manner along the longitudinal direction of the battery module 53.

Specifically, the coupling protrusion 319 of the plurality of band members 311 may be slidably inserted and mounted into the sliding rail 207 along the longitudinal direction of the battery module 53.

In the present embodiment, since the band members 311 may be mounted on the side plates 203 movably along the longitudinal direction of the battery module 53, mounting positions of the band members 311 may be varied.

Therefore, in the present embodiment, depending on the design conditions such as the size of the battery module 53 or the number of battery cells, or the capacity of the battery module 53 in the future, the fixing position of the band members 311 may be simply and easily changed to an optimal position at which more stable support and fixation of the battery cell assembly 100 can be secured.

Figure 11:
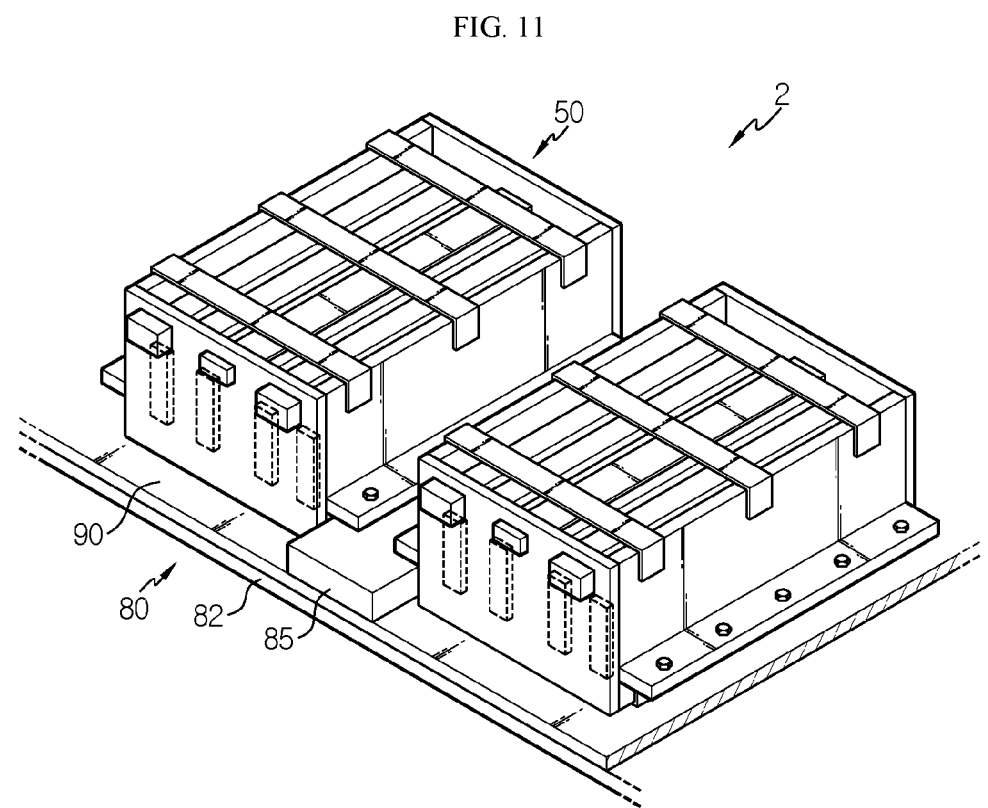
FIG. 11 is a view for describing a battery pack according to another embodiment of the present disclosure.

FIG. 11 is a view for describing a battery pack according to another embodiment of the present disclosure.

A battery pack 2 according to the present embodiment is similar to the battery pack 1 of the above embodiment, and thus a repeated description of elements that are substantially the same as or similar to those in the above embodiment will be omitted and the following will focus on a difference from the above embodiment.

Referring to FIG. 11, the battery pack 2 may include a plurality of battery modules 50, a pack tray 80, and an integrated heatsink 90.

Since the plurality of battery module 50 are substantially the same as or similar to the above embodiment, a redundant description thereof will be omitted.

The pack tray 80 may include a tray body 82 and a mounting beam 85.

Since the tray body 82 and the mounting beam 85 are similar to the tray body 12 and the mounting beam 15 of the above embodiment, redundant descriptions are omitted below.

The integrated heatsink 90 is provided on the tray body 82 of the pack tray 80, and may be provided in a shape and size capable of covering all of the plurality of battery modules 50.

The integrated heatsink 90 may be provided on the tray body 82 of the pack tray 80 while integrally covering the bottom surface of the plurality of battery modules 50.

As such, the battery pack 2 according to the present embodiment may integrally control the cooling of the plurality of battery modules 50 through the integrated heatsink 90 and more stably support the plurality of battery modules 50.

Figure 12:
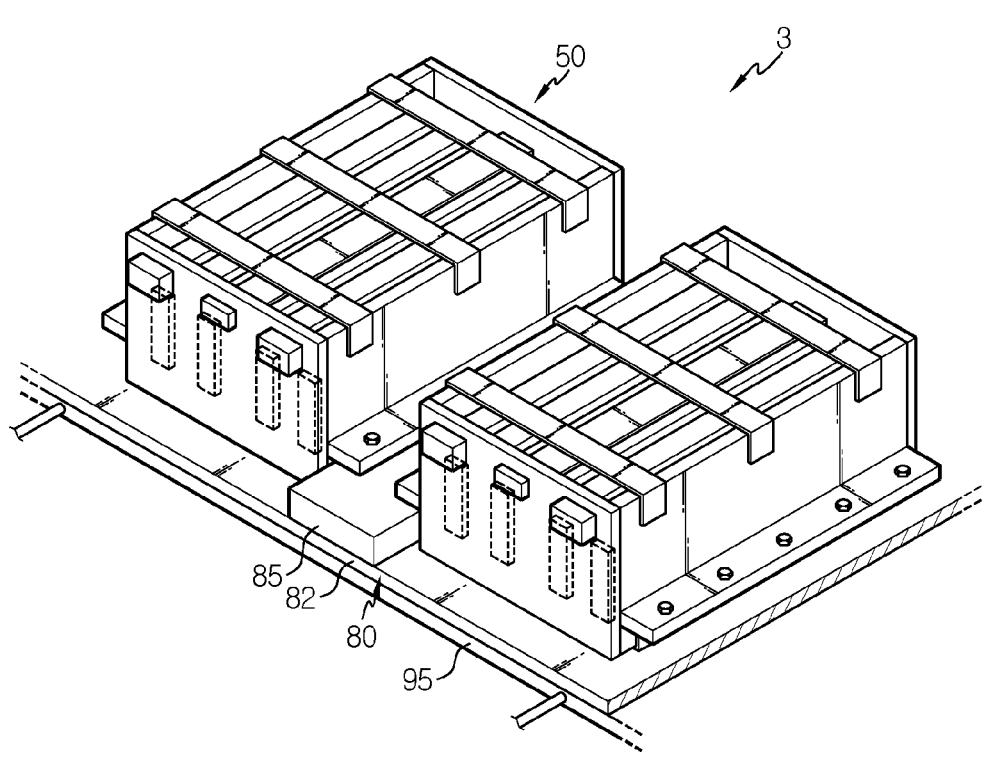
FIG. 12 is a view for describing a battery pack according to still another embodiment of the present disclosure.

FIG. 12 is a view for describing a battery pack according to still another embodiment of the present disclosure.

A battery pack 3 according to the present embodiment is similar to the battery pack 2 of the above embodiment, and thus a repeated description of elements that are substantially the same as or similar to those in the above embodiment will be omitted and the following will focus on a difference from the above embodiment.

Referring to FIG. 12, the battery pack 3 may include a plurality of battery modules 50, a pack tray 80, and an integrated heatsink 95.

Since the plurality of battery module 50 is substantially the same as or similar to the above embodiment, a redundant description thereof will be omitted.

The pack tray 80 may include a tray body 82 supporting a bottom portion of the plurality of battery modules 50 and a mounting beam 85 provided on the tray body 82 and disposed between the plurality of battery modules 50.

The integrated heatsink 95 may include a cooling pipe for cooling, and may be provided on the bottom portion of the tray body 82, unlike the above embodiment. That is, the integrated heatsink 95 may be provided on the lower side of the pack tray 80 instead of the upper side of the pack tray 80.

Meanwhile, it may be possible to provide a thermal interface member between the integrated heatsink 95 and the pack tray 80 to further improve heat transfer so as to further secure cooling performance.

FIG. 13 is a view for describing a vehicle according to an embodiment of the present disclosure.

Referring to FIG. 13, the vehicle V according to the present embodiment may include at least one battery pack 1 of the above embodiment. The battery pack 1 provided in the vehicle V may be provided as a fuel source of the vehicle. By way of example, the battery pack 1 may be provided in an electric vehicle, a hybrid vehicle, and any other type of vehicle V capable of using the battery pack 1 as a fuel source.

Also, the battery pack 1 may be provided in other devices, instruments, and facilities, such as an energy storage system using a secondary battery, in addition to the vehicle V.

In addition, the vehicle V may also include at least one battery pack (2, 3, see FIGS. 11 and 12) of the above embodiment, and may also include a combination of the battery pack 1 and the battery pack (2, 3, FIGS. 11 and 12).

In the present embodiment, since the above-described battery packs 1, 2, 3 are provided in a compact structure having a high energy density, when mounted on the vehicle V, a modular structure of a plurality of battery packs 1, 2, 3 may be easily implemented, and it is possible to secure a relatively high degree of freedom in mounting even in various internal space shapes of the vehicle V.

Therefore, according to various embodiments as described above, it is possible to provide a battery pack 1, 2, 3 capable of increasing energy density and a vehicle V including the battery pack.

In addition, according to various embodiments as described above, it is possible to provide a battery pack 1, 2, 3 capable of reducing the overall weight through weight reduction and a vehicle V including the battery pack.

In addition, according to various embodiments as described above, it is possible to provide a battery pack 1, 2, 3 capable of more efficiently controlling cell swelling and a vehicle V including the battery pack.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A battery pack comprising:
a pack tray; and
at least one battery module provided on the pack tray,
wherein the at least one battery module includes:
a battery cell assembly mounted on the pack tray and including at least one battery cell;
a pair of side plates provided on opposite side surfaces of the battery cell assembly to support the battery cell assembly and fixed to the pack tray;
a sliding rail formed in at least one of the pair of side plates; and
a band assembly connected to the pair of side plates and configured to at least partially cover an upper side and a lower side of the battery cell assembly,
wherein the band assembly includes a plurality of upper band members configured to at least partially cover the upper side of the battery cell assembly, each of the plurality of upper band members comprising:
an upper band body disposed on the upper side of the battery cell assembly;
an upper band fixing portion bent from the upper band body and fixed to the pair of side plates; and
a coupling protrusion extending from the upper band fixing portion,
wherein the coupling protrusion extends into the sliding rail.

2. The battery pack according to claim 1, wherein the band assembly further includes:

at least one lower band member configured to at least partially cover the lower side of the battery cell assembly.

3. The battery pack according to claim 2, wherein the at least one lower band member includes:
a lower band body disposed on the lower side of the battery cell assembly; and
a lower band fixing portion bent from the lower band body and fixed to the pair of side plates.

4. The battery pack according to claim 2,
wherein the plurality of upper band members are spaced apart from each other by a predetermined distance along a longitudinal direction of the battery cell assembly.

5. The battery pack according to claim 2, wherein the at least one lower band member is a plurality of lower band members, and
wherein the plurality of lower band members are spaced apart from each other by a predetermined distance along a longitudinal direction of the battery cell assembly.

6. The battery pack according to claim 1, wherein the pair of side plates includes:
a support portion configured to support the battery cell assembly; and
a fixing portion extending from the support portion and fixed to the pack tray.

7. The battery pack according to claim 6, wherein the support portion covers a side surface of the battery cell assembly and is disposed perpendicular to the pack tray, and
wherein the fixing portion is formed to protrude perpendicular to the support portion by a predetermined length.

8. The battery pack according to claim 7, wherein a mounting beam of a predetermined length is provided on an upper surface of the pack tray, and
wherein the fixing portion is fixed to the mounting beam.

9. The battery pack according to claim 8, wherein the fixing portion is above the mounting beam.

10. The battery pack according to claim 9, wherein the at least one battery module further includes at least one fastening member for fixing the fixing portion and the mounting beam.

11. The battery pack according to claim 10, wherein the at least one fastening member is fastened to the mounting beam through the fixing portion.

12. A vehicle comprising at least one battery pack according to claim 1.

13. The battery pack according to claim 1, further comprising a heat sink under the at least one battery module,
wherein first fasteners extend through the pair of side plates into the heat sink.

14. The battery pack according to claim 13, wherein each of the pair of side plates has an outwardly extending fixing portion, and
wherein the first fasteners are under the fixing portion.

15. The battery pack according to claim 1, further comprising a beam extending next to the at least one battery module,
wherein at least one of the pair of side plates has an outwardly extending fixing portion, and
wherein second fasteners extend through a top surface of the outwardly extending fixing portion and into the beam.

* * * * *